United States Patent [19]

Nishiguchi

[11] Patent Number: 5,792,246

[45] Date of Patent: Aug. 11, 1998

[54] DEFOAMING APPARATUS

[75] Inventor: Shoji Nishiguchi, Urawa, Japan

[73] Assignee: Sumitomo Bakelite Company Limited, Tokyo, Japan

[21] Appl. No.: 670,435

[22] Filed: Jun. 26, 1996

[30] Foreign Application Priority Data

Jun. 30, 1995 [JP] Japan .................................. 7-165044
Sep. 8, 1995 [JP] Japan .................................. 7-231535

[51] Int. Cl.$^6$ ................................................ B01D 19/02
[52] U.S. Cl. .......................... 96/177; 95/242; 96/217
[58] Field of Search .......................... 95/242, 157, 253, 95/260; 96/177, 176, 204, 217; 422/225, 229; 366/241, 279

[56] References Cited

U.S. PATENT DOCUMENTS

| | | | |
|---|---|---|---|
| 1,316,947 | 9/1919 | Wirth-Frey | 96/177 |
| 1,811,513 | 6/1931 | Mason | 96/177 |
| 1,868,826 | 7/1932 | Guest | 96/177 |
| 1,906,526 | 5/1933 | Bradford | 96/177 |
| 2,610,155 | 9/1952 | Humfeld et al. | 96/177 |
| 2,908,652 | 10/1959 | Forrester | 95/242 |
| 3,169,841 | 2/1965 | Weis | 95/242 |
| 3,356,348 | 12/1967 | Paul, Jr. | 95/242 |
| 3,470,265 | 9/1969 | Sprow | 422/225 |
| 3,520,822 | 7/1970 | Traelnes | 96/177 |
| 3,616,601 | 11/1971 | Senkewich | 95/260 |
| 3,649,557 | 3/1972 | Freedman et al. | 96/177 |
| 3,980,281 | 9/1976 | Okabayashi et al. | 366/279 |
| 4,264,215 | 4/1981 | Nunlist et al. | 366/279 |
| 4,339,205 | 7/1982 | Kato et al. | 96/177 |
| 4,373,024 | 2/1983 | Hunt | 95/242 |

FOREIGN PATENT DOCUMENTS

| | | | |
|---|---|---|---|
| 535055 | 12/1956 | Canada | 96/177 |
| 46651 | 12/1932 | Denmark | 96/177 |
| 3519374 | 1/1987 | Germany | 96/177 |
| 55-11011 | 1/1980 | Japan | 96/177 |
| 63-200834 | 8/1988 | Japan | 422/225 |
| 615100 | 1/1980 | Switzerland | 96/177 |
| 919698 | 4/1982 | U.S.S.R. | 96/177 |

Primary Examiner—Duane S. Smith
Attorney, Agent, or Firm—Browdy and Neimark

[57] ABSTRACT

A defoaming apparatus is used in a reactor in which a chemical reaction, involving the formation of foam, is effected. The defoaming apparatus includes an impeller disposed at an upper portion of an interior of the reactor, and a motor for rotating the impeller about an axis thereof. The impeller has a plurality of radially outwardly-extending blades. Each of the blades is in a form of a flat plate or a curved plate. A plurality of impellers may be arranged along the axis of rotation. In this case, the impellers of the same configuration can be circumferentially disaligned from each other. The outer edge of each blade is inclined.

20 Claims, 13 Drawing Sheets

DEFOAMING APPARATUS

FIELD OF THE INVENTION AND RELATED ART STATEMENT

This invention relates to a defoaming apparatus used in a reactor in which a chemical reaction is effected. More specifically, the invention relates, for example, to a defoaming apparatus which prevents foam, produced by a chemical reaction, from going up to a condenser and so on provided above the reactor, and also prevents such foam from filling an upper space of an interior of the reactor above a chemical reaction material. This type of defoaming apparatus is used in a reactor used, for example, in the production of a resin, the incubation of a microorganism, and the brewing of liquor.

A conventional defoaming apparatus of the type described includes a plurality of blades extending radially from a rotary shaft. Each of the blades extends oblique from the rotary shaft so that a plane including an axis of the rotary shaft intersects a plane in which the blade extends at an angle of 45 degrees.

The defoaming apparatus of this type can not satisfactorily extinguish foam (or bubbles) produced by a chemical reaction, and may promote the generation of foam.

OBJECT AND SUMMARY OF THE INVENTION

It is therefore an object of this invention to provide a defoaming apparatus having a high defoaming ability.

To this end, according to the present invention, there is provided a defoaming apparatus for a reactor, comprising:

an impeller mounted at an upper portion of an interior of the reactor in which a chemical reaction is to be effected, the impeller having a plurality of radially outwardly-extending blades; and drive means for rotating the impeller about an axis of rotation thereof.

According to another aspect of the invention, upper and lower side edges of each of the blades of the impeller extend in a direction normal to the axis of rotation, and a radial outer edge of the blade extends obliquely radially outwardly from the lower side edge toward the upper side edge.

DETAILED DESCRIPTION OF THE PREFERRED EMBODIMENTS

The present invention will now be described with reference to the drawings.

Figure 1:
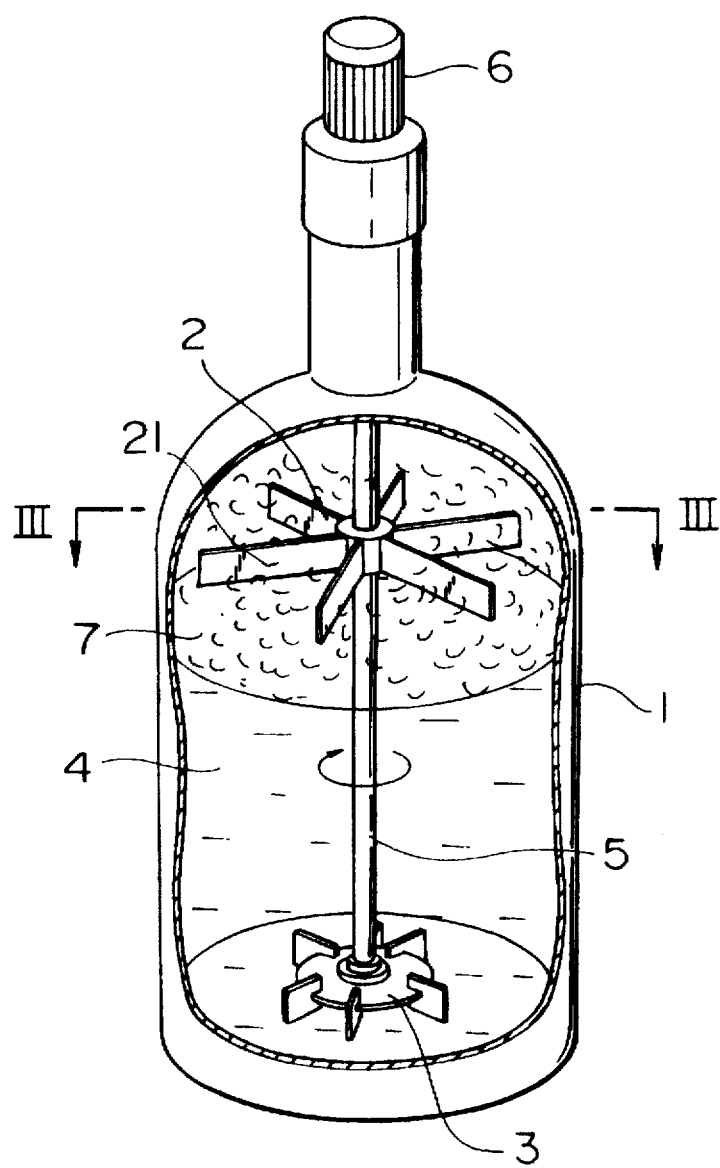
FIG. 1 is a partially sectional, perspective view of a reactor provided with a preferred embodiment of a defoaming apparatus of the present invention.

FIG. 1 shows a reactor 1 provided with a preferred embodiment of a defoaming apparatus of the present invention. An impeller 2, having a plurality of blades 21, is provided at an upper portion of an interior of the reactor 1, and an agitator 3 for agitating a reaction material 4 to promote a chemical reaction is provided at a bottom portion of the interior of the reactor 1. The impeller 2 and the agitator 3 are mounted onto a common rotary shaft 5. The rotary shaft 5 is adapted to be rotated by a motor 6 mounted on the top of the reactor 1.

Figure 2:
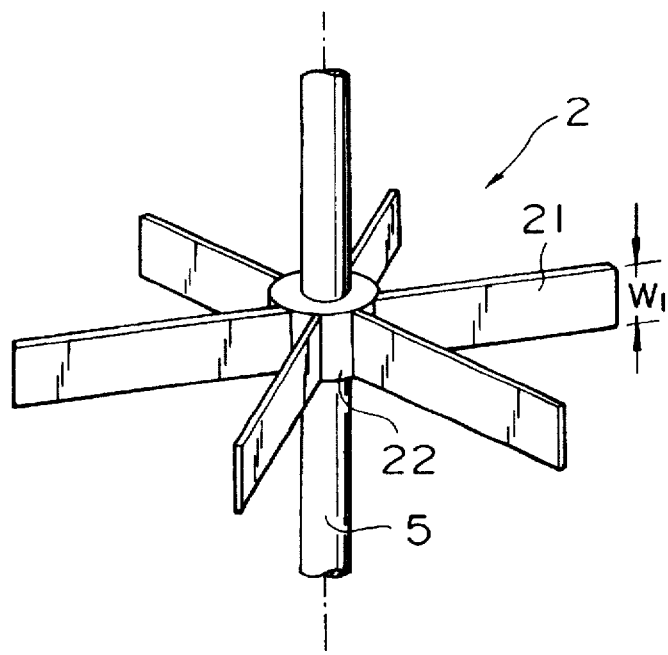
FIG. 2 is a perspective view showing an impeller of the defoaming apparatus of FIG. 1.
Figure 3:
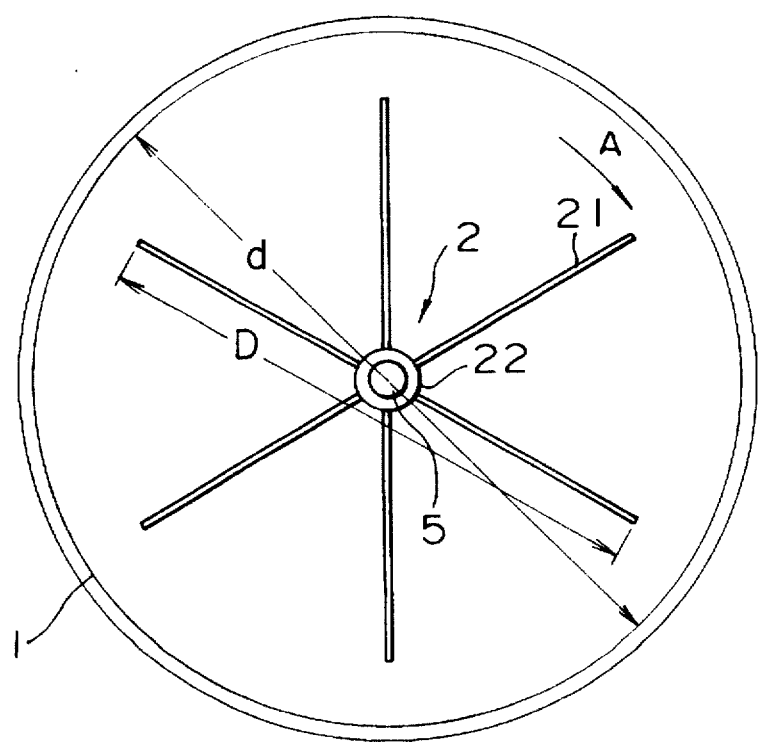
FIG. 3 is a sectional view of the apparatus taken along the lines III—III of FIG. 1.

As shown in FIGS. 2 and 3, the impeller 2 has six blades 21 extending radially outwardly from a boss 22 fixed to the rotary shaft 5. The impeller 2 is a flat blade impeller in which each of the blades 21 in the form of a flat plate of a rectangular shape. When the impeller 2 is rotated by the motor 6 through the rotary shaft 5, the foam 7 formed by a chemical reaction is extinguished by a shearing effect and a centrifugal effect caused by the rotation of the blades 21.

Figure 12:
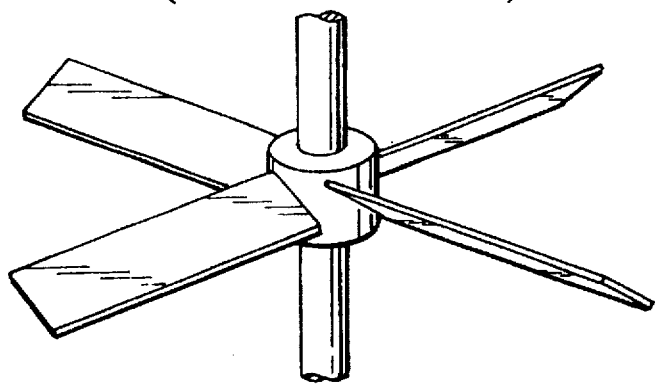
FIG. 12 is a perspective view of an impeller of a conventional defoaming apparatus.
Figure 13:
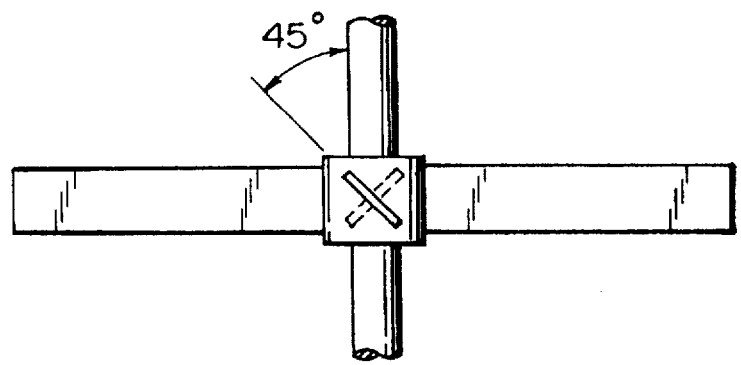
FIG. 13 is a side-elevational view of the impeller of FIG. 12.
Figure 14:
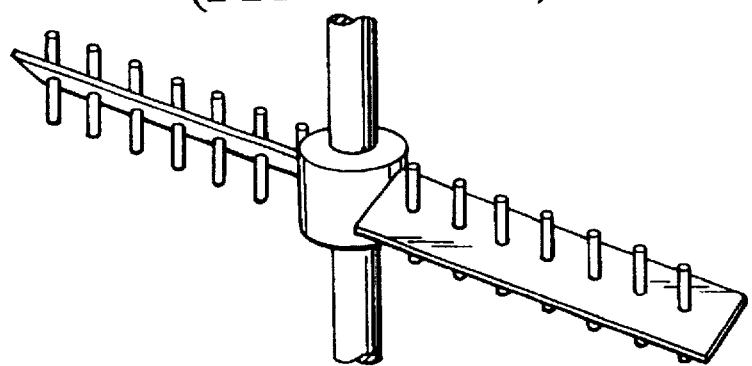
FIG. 14 is a perspective view of an impeller of another conventional defoaming apparatus.

Each of the blades 21 is fixedly secured to the boss 22 in such a manner that a plane in which the blade 21 extends or lies is parallel to an axis of the rotary shaft 5. On the other hand, in the conventional defoaming apparatus, a plane in which each blade extends intersects the axis of the rotary shaft at an angle of 45 degrees as shown in FIGS. 12 and 13. Therefore the blades can not achieve a sufficient shearing effect, and then the conventional defoaming apparatus has a lower defoaming ability. There is known another impeller in which a plurality of posts are formed on each of inclined blades, as shown in FIG. 14, but its defoaming ability is also not sufficient.

Figure 9:
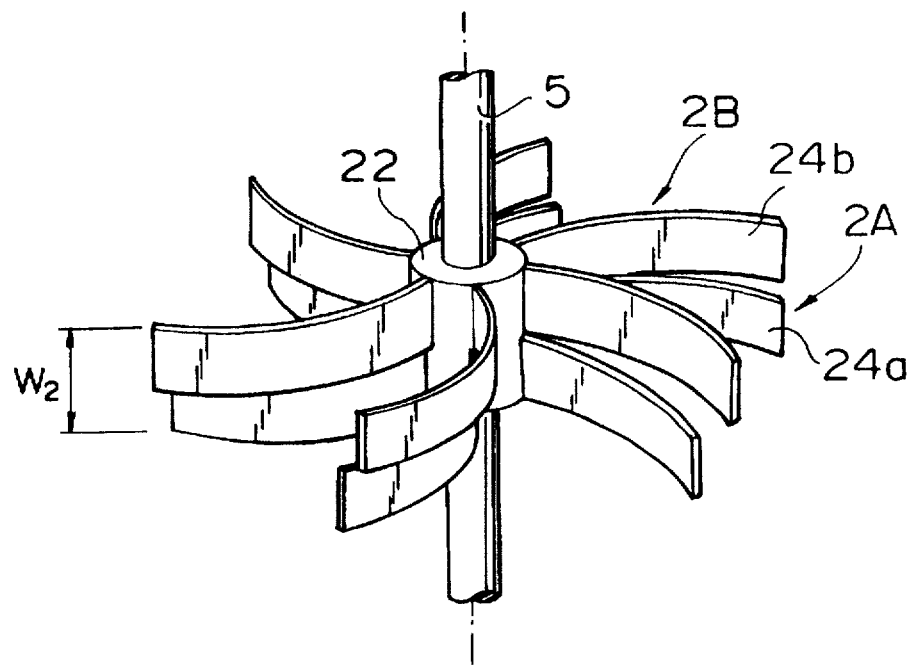
FIG. 9 is a perspective view showing impellers of the defoaming apparatus of FIG. 8.

The closer to 1 the ratio (D/d) of an outer diameter D of the impeller 2 to an inner diameter d of the reactor 1 is, the higher the defoaming ability is. However, in view of the operability and so on, this ratio (D/d) is selected to be in a range of between 0.3 and 0.95, and preferably between 0.5 and 0.8. Further, a ratio (D/w) of the outer diameter D of the impeller 2 to a width $w_1$, of the blade 21 is usually in a range of between 0.05 and 0.40, and preferably between 0.07 and 0.20. A length of the boss 22 is substantially equal to the width of the blade 21. This specified limitation of the ratio (D/w) may be applicable to the embodiment having 2 or more impellers as shown in FIG. 9, in which a width W is equal to a total width of the impellers, namely a width $w_2$.

When the impeller 2 rotates at a higher speed, the defoaming ability increases accordingly. Usually, the number of revolution (rotation) of the impeller 2 is in the range of between 30 rpm and 200 rpm, and preferably between 50 rpm and 150 rpm. If the impeller is to be rotated at the rate of less than 30 rpm, the defoaming ability can be increased by setting the ratio (D/d) to not less than 0.8. In contrast, if the impeller is to be rotated at the rate of not less than 100 rpm, the high defoaming ability can be achieved although a substantial gap is formed between the outer periphery of the impeller 2 and the inner periphery of the reactor 1 as in the case of D/d≠0.5.

These can be applied to any reaction material regardless of the viscosity.

Figure 4:
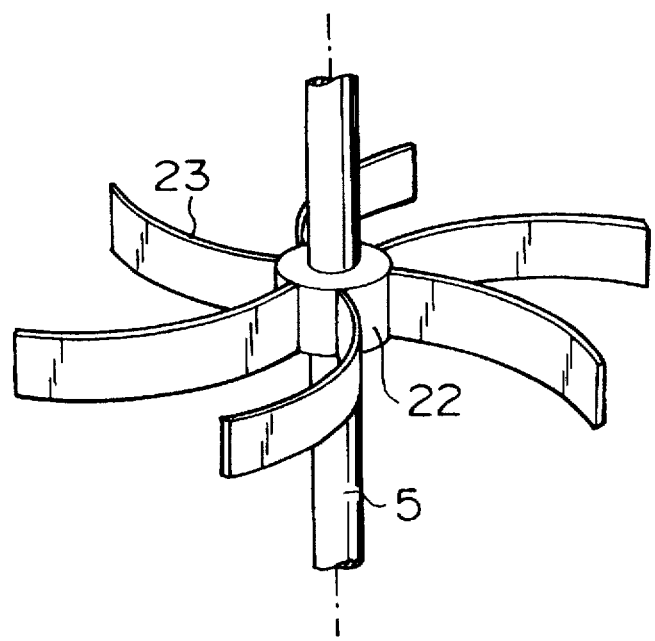
FIG. 4 is a perspective view showing a modified impeller.
Figure 5:
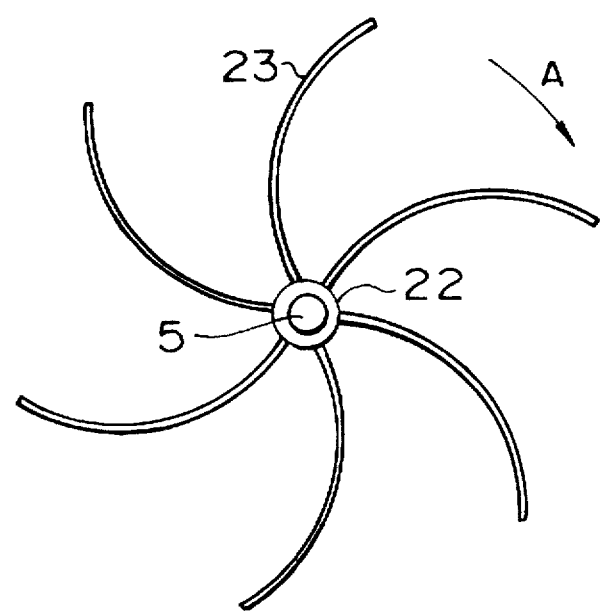
FIG. 5 is a top plan view of the impeller of FIG. 4.
Figure 6:
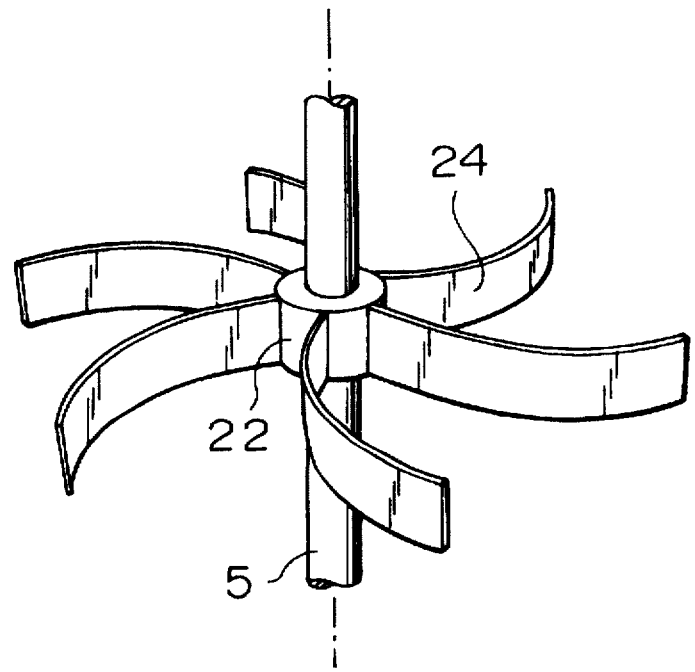
FIG. 6 is a perspective view showing another modified impeller.
Figure 7:
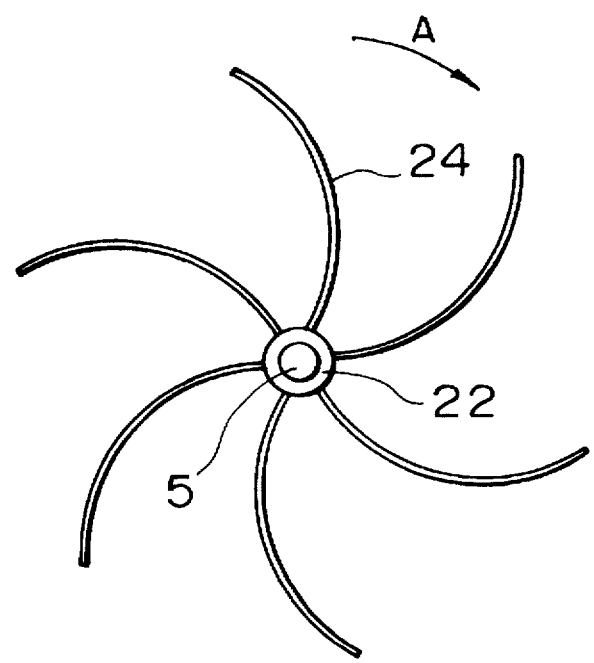
FIG. 7 is a top plan view of the impeller of FIG. 6.

Instead of the impeller shown in FIG. 2, impellers 23 and 24 shown in FIGS. 4 and 6 can be used. These impellers are a curved blade impeller in which each of blades is in the form of a curved rectangular plate. As shown in FIG. 5, each of the blades 23 is concave in the direction of rotation of the impeller as indicated by arrow A. As shown in FIG. 7, each of the blades 24 is convex in the direction of rotation of the impeller as indicated by arrow A. The blades 23, as well as the blades 24, are mounted on a boss 22 in such a manner that a curved plane in which each blade extends is parallel to an axis of a rotary shaft 5. When the impeller of FIG. 4 is used, foam is drawn into a space between any two adjacent blades 23 by means of a centripetal force, and is forced toward a central portion of the impeller and squeezed into a portion adjacent proximal ends of the blades of the impeller to break the foam, so that a higher defoaming ability can be achieved.

As shown in FIGS. 4 and 5, the invention includes each of the blades curving within a plane perpendicular to the impeller rotation axis, and away from the rotation axis toward a direction of rotation; and also the blades rotating about the rotation axis in the direction of rotation. Thus the outer end of each blade leads a remaining portion of the blade during rotation.

Figure 8:
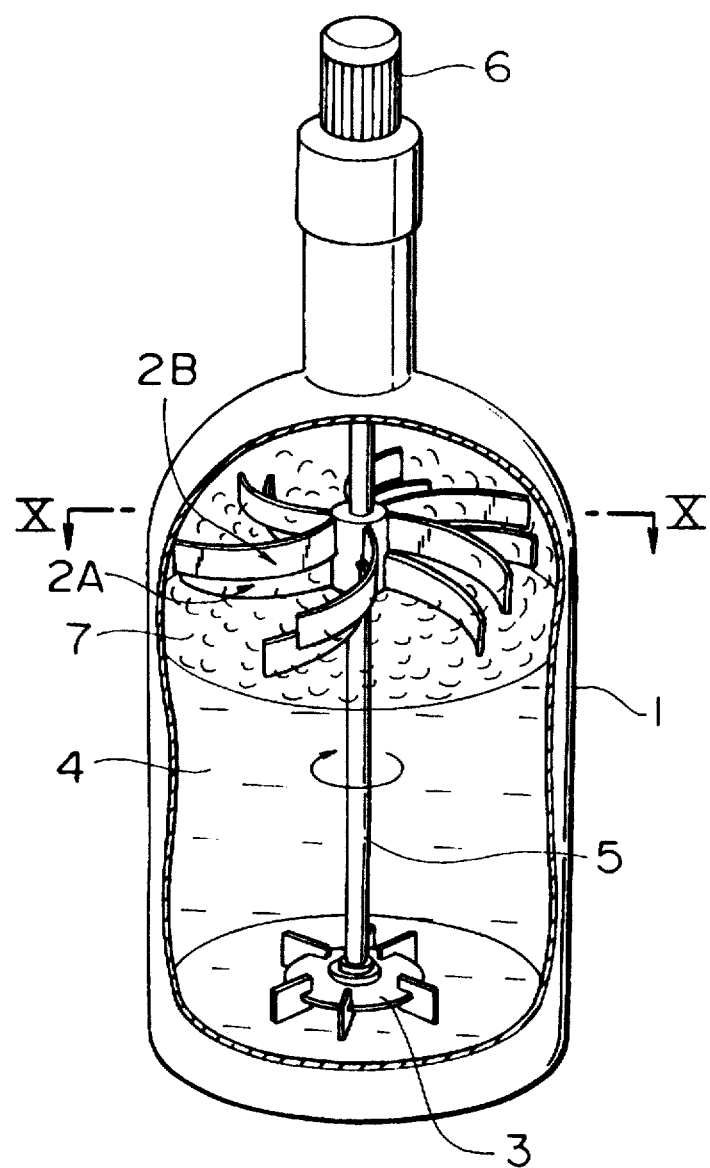
FIG. 8 is a partially sectional, perspective view of a reactor provided with another embodiment of a defoaming apparatus of the invention.
Figure 10:
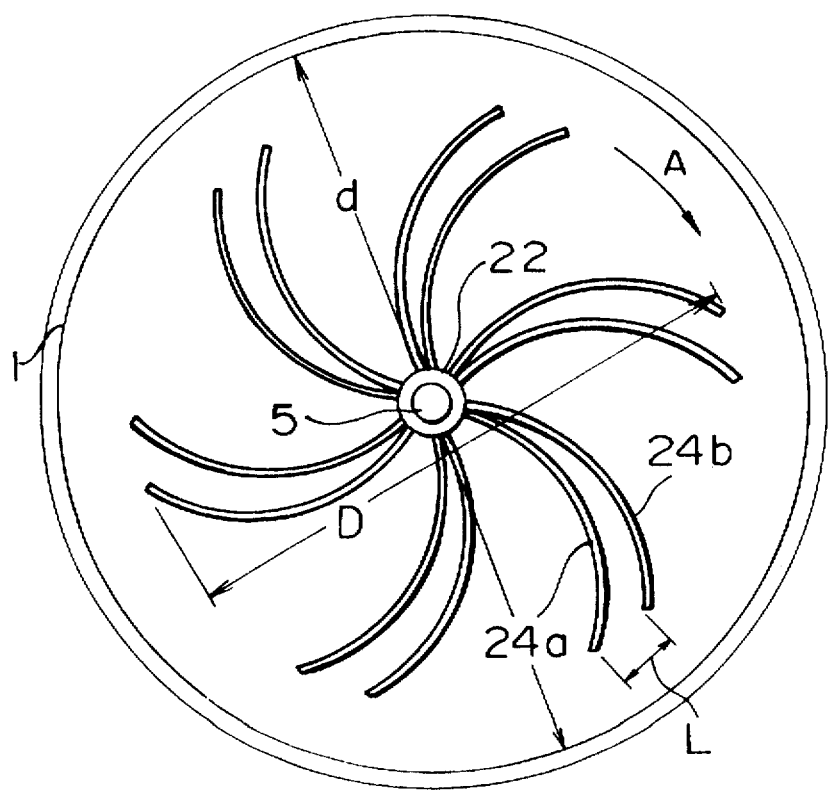
FIG. 10 is a sectional view of the apparatus taken along the lines X—X of FIG. 8.

In another embodiment of the invention shown in FIG. 8, a pair of curved blade impellers 2A and 2B are mounted in series onto a rotary shaft 5. Although the two impellers of the same configuration may be disposed in series to be aligned with each other, two impellers 2A and 2B are disposed to be out of alignment with or disaligned with each other in this embodiment. This arrangement is preferable. More specifically, two impellers 2A and 2B are circumferentially disaligned with each other in such a manner that the tip (distal end) of each blade 24a of the impeller 2A is apart from the tip of the corresponding blade 24b of the impeller 2B by a distance L which is not more than 20% of an outer diameter (D) of the impellers, and preferably 5% to 10% of the outer diameter (see FIGS. 9 and 10).

In this embodiment, the lower impeller 2A extinguishes almost of foam or bubbles and the upper impeller 2B extinguishes or cleans out the remaining foam. Therefore, the defoaming ability can be considerably improved.

If the sufficient defoaming ability can not be obtained with two impellers, three or more impellers can be used, in which case the adjacent impellers would be disaligned with one another as in the construction of FIG. 8. With this arrangement a higher defoaming ability can be achieved.

In some cases, n impellers may be disposed so that one of adjacent two impellers (an upper impeller) is placed on the other impeller (a lower impeller) and circumferentially disaligned by a pitch equal to 1/n of a circumferential distance between adjacent two blades of the impeller.

Figure 11:
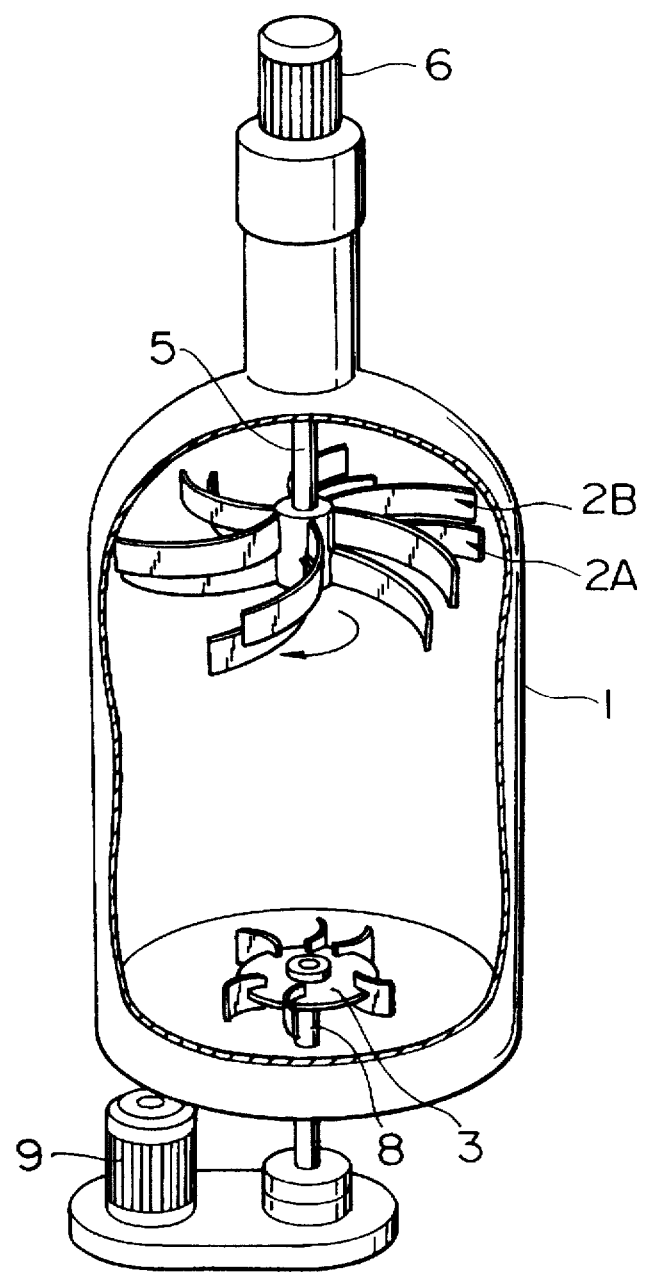
FIG. 11 is a partially sectional, perspective view of a reactor provided with a further embodiment of a defoaming apparatus of the invention.

In the embodiment shown in FIG. 11, impellers 2A and 2B are mounted on a rotary shaft 5, and are adapted to be rotated by a motor 6. An agitation disc 3 is mounted on another rotary shaft 8, and is adapted to be rotated by a motor 9. Thus, the impellers 2A and 2B and the agitation disc 3 are adapted to be driven separately from each other. This embodiment is suitably applied to the case where a reaction material must be agitated, slowly, but the impellers must be rotated at a high speed since the amount of production of foam is large.

Figure 15:
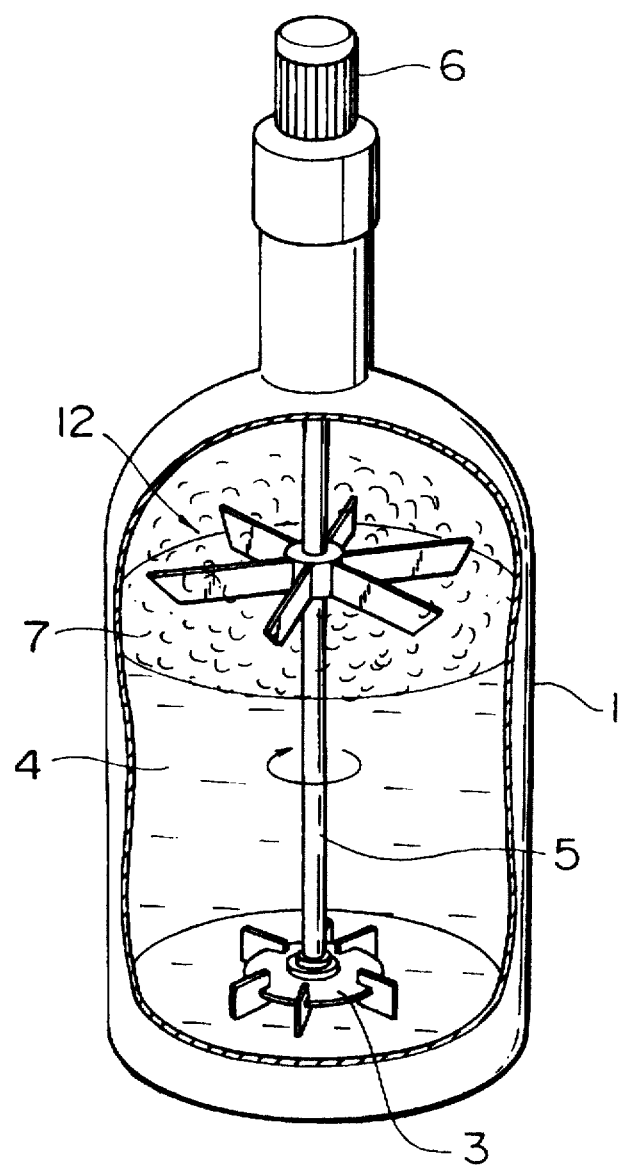
FIG. 15 is a partially sectional, perspective view of a reactor provided with a further embodiment of a defoaming apparatus of the invention.
Figure 16:
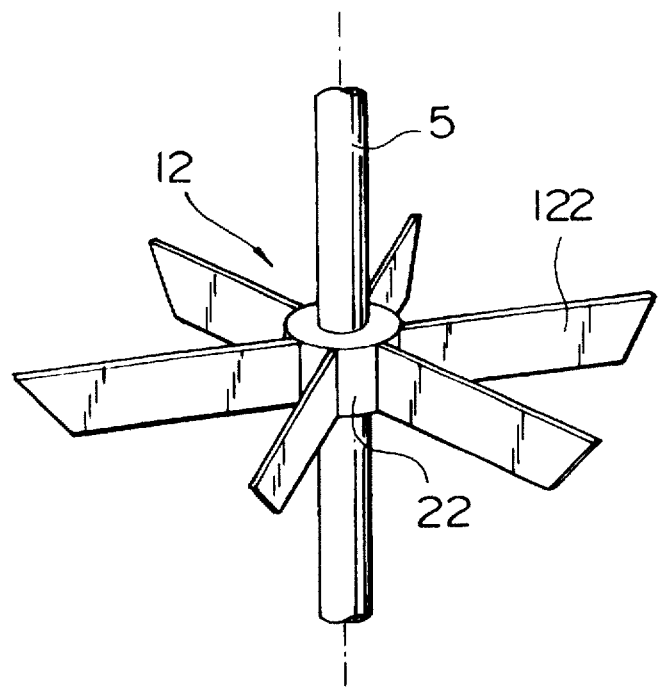
FIG. 16 is a perspective view showing an impeller of the defoaming apparatus of FIG. 15.
Figure 17:
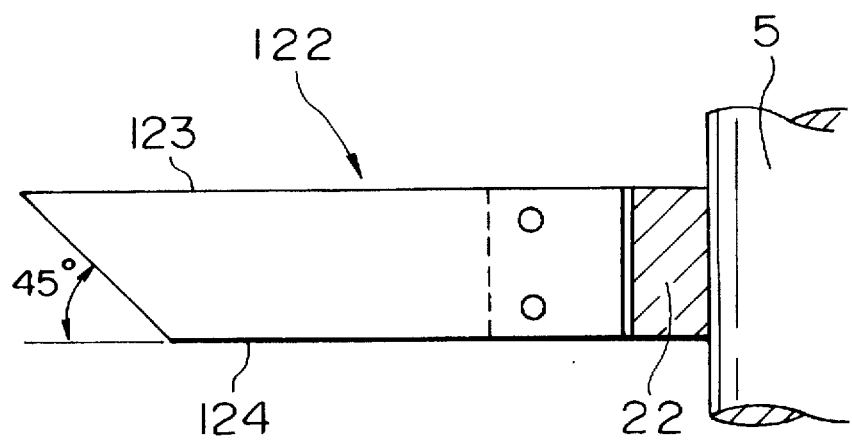
FIG. 17 is a fragmentary view showing a distal end portion of a blade of the impeller of FIG. 16.

In the embodiment shown in FIG. 15, an impeller 12 is a flat blade impeller. However, as is clear from FIG. 16, each of blades 122 is a flat plate, but is not rectangular. As shown in FIG. 17, opposite side edges 123 and 124 of the blade 122 extend in a direction normal to an axis of a rotary shaft 5, that is, the two side edges 123 and 124 extend perpendicular to the axis of the rotary shaft 5. An outer edge of the blade 122 extends obliquely from the lower side edge 124 to the upper side edge 123. The inclination angle between the outer edge of the blade 122 and the above normal direction is 45 degrees.

Figure 18:
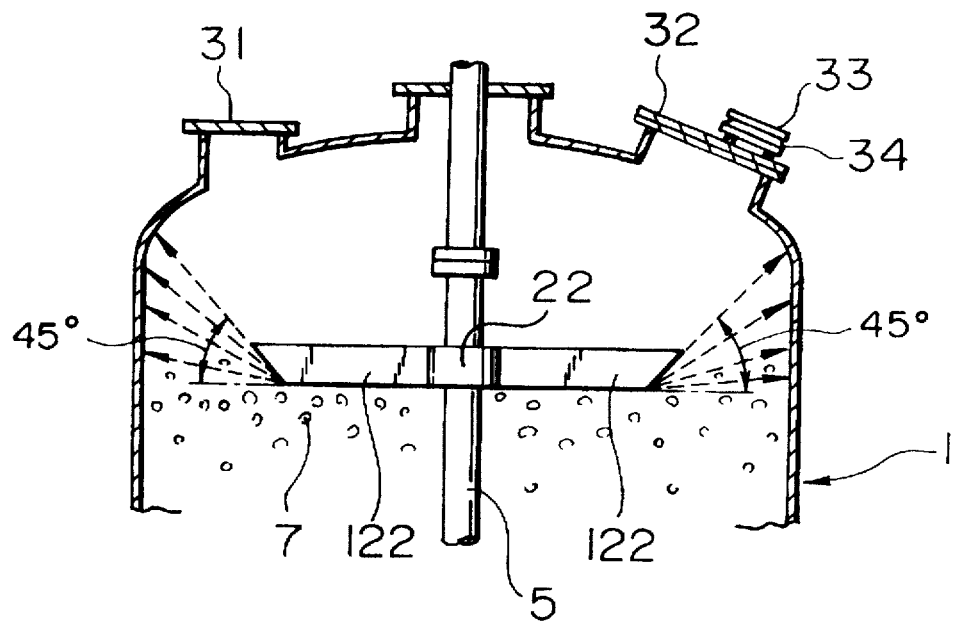
FIG. 18 is a cross-sectional view showing the reactor of FIG. 15 in detail.
Figure 19:
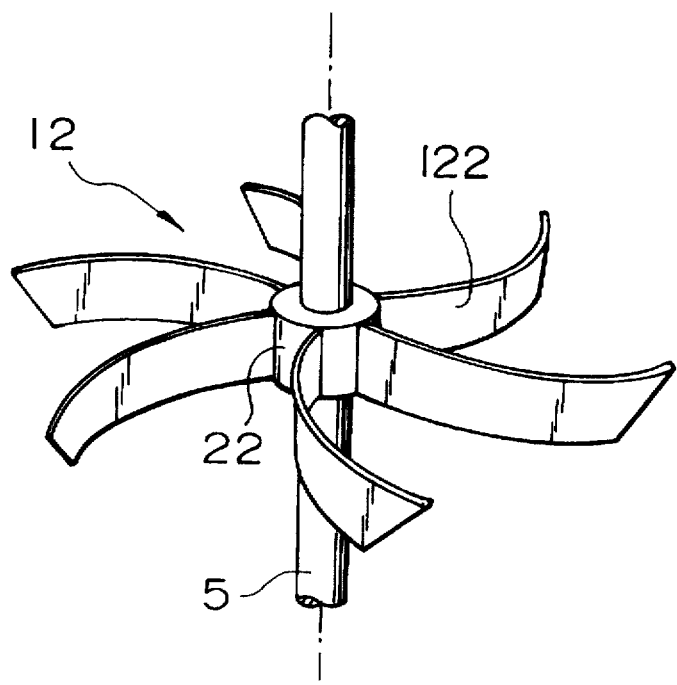
FIG. 19 is a perspective view of a modified impeller used in the defoaming apparatus of FIG. 15.

In this embodiment, even when the impeller 12 rotates at a high speed, foam is directed in directions indicated by arrows in FIG. 18 along the outer edges of the blades 122, and are blown off. Namely, the foam will not be blown off at an angle larger than the inclination angle of the outer edges of the blades 122. In other words, the foam will not come into an imaginary body of rotation (which encompasses a steam tube 31 and a manhole 32) defined by the outer edges of the rotating blades 122. Therefore, splashes of the foam will not reach a condenser through the vapor tube 31, and will not adhere to an inspection glass window 33 of the manhole 32, and therefore the interior of the reactor can be clearly inspected through this inspection window. The inclination angle should be in the range of between 30 degrees and 75 degrees, and preferably in the range of between 45 degrees and 60 degrees. Even if a curved blade impeller as shown in FIG. 19 is used instead of the flat blade impeller, similar effects can be achieved.

Figure 20:
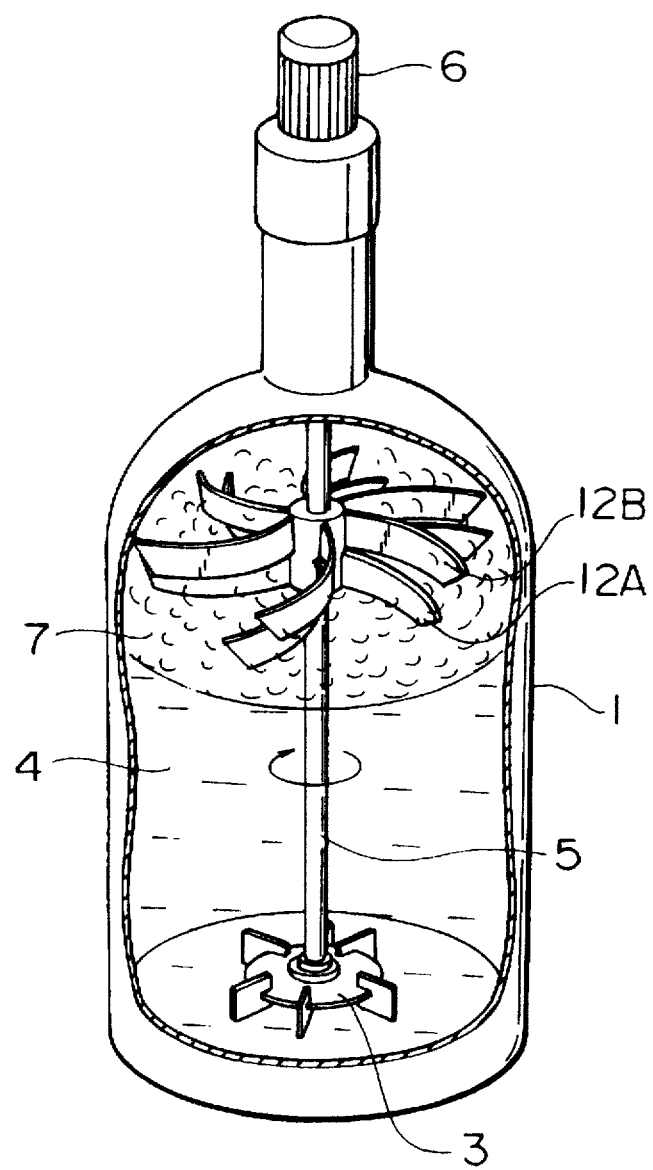
FIG. 20 is a partially sectional, perspective view of a reactor provided with a further embodiment of a defoaming apparatus of the invention.
Figure 21:
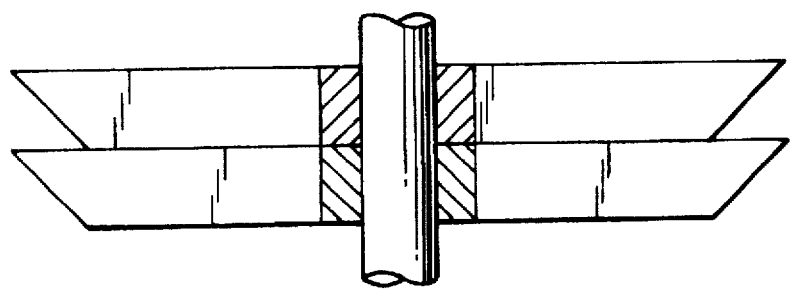
FIGS. 21 and 22 are front-elevational views of impellers used in the defoaming apparatus of FIG. 20.
Figure 22:
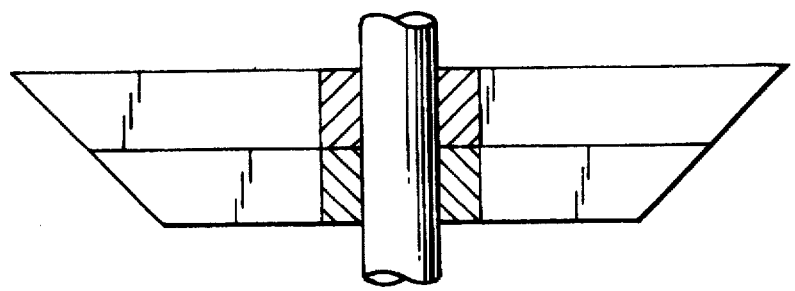

As shown in FIG. 20, two impellers 12A and 12B, each having blades whose outer edges are inclined as described above, may be arranged in such a manner that they are circumferentially disaligned with each other as described above. In this case, two impellers 12A and 12B may have the same configuration as shown in FIG. 21, or may have such different configurations that the inclined outer edges of the blades of the impellers 12A and 12B cooperate with each other to define or generate a generally inverted conical surface upon rotation of the impellers 12A and 12B, as shown in FIG. 22. In view of the defoaming efficiency, the construction of FIG. 21, in which the total area of the blades is larger, is more advantageous.

In the above embodiments, although the number of the blade of the impeller is six, the invention is not limited to such a construction. The number of the blades is so determined that the adjacent blades are spaced from one another to provide a sufficient gap for allowing the operator to easily enter the reactor 1 through such gap from the manhole 32 for cleaning or maintenance purposes. Depending on the reaction material and the reactor, the number of the blades is 4 to 16, and preferably 6 to 12.

Generally, the blades and so on are made of corrosion-resistant metal. However, when it is necessary to prevent contamination by metal ions, the blades and so on are made of a titanium compound, a hafnium compound, a zirconium compound, a plastics material, or wood.

What is claimed is:

1. A defoaming apparatus for a reactor, comprising:

an impeller disposed at an upper portion of an interior of the reactor in which a chemical reaction is effected, said impeller having a plurality of radially outwardly-extending blades, each of said blades being curved;

each of said blades including a respective outer end inclined toward a direction of rotation; and drive means for rotating said impeller in the direction of rotation about an axis of rotation thereof;

whereby the outer end leads a remaining portion of the blade during the rotation.

2. Apparatus according to claim 1, wherein a plurality of impellers are provided along said axis of rotation.

3. Apparatus according to claim 2, wherein the number of said impellers is two or three.

4. Apparatus according to claim 3, wherein any two adjacent ones of said impellers are circumferentially disaligned with each other in such a manner that radial outer edges of corresponding blades of said adjacent impellers are apart from each other by a distance which is not more than 20% of an outer diameter of said impeller.

5. Apparatus according to claim 1, wherein upper and lower side edges of each of said blades of said impeller extend in a direction normal to said axis of rotation, and a radial outer edge of said blade extends obliquely radially outwardly from said lower side edge to said upper side edge.

6. Apparatus according to claim 5, wherein an inclination angle between the outer edge of said blade and said normal direction is in a range of between 30 degrees and 75 degrees.

7. Apparatus according to claim 5, wherein a plurality of impellers are provided along said axis of rotation.

8. Apparatus according to claim 7, wherein the number of said impellers is two or three.

9. Apparatus according to claim 7, wherein any two adjacent ones of said impellers are circumferentially disaligned from each other in such a manner that radial outer edges of corresponding blades of said adjacent impellers are apart from each other by a distance which is not more than 20% of an outer diameter of said impellers.

10. Apparatus according to claim 8, wherein any two adjacent ones of said impellers are circumferentially disaligned from each other in such a manner that radial outer edges of corresponding blades of said adjacent impellers are apart from each other by a distance which is not more than 20% of an outer diameter of said impellers.

11. Apparatus according to claim 1, wherein a plane in which each of said blades extends is parallel to said axis of rotation.

12. Apparatus according to claim 2, wherein a plurality of impellers are provided along said axis of rotation.

13. Apparatus according to claim 12, wherein the number of said impellers is two or three.

14. Apparatus according to claim 12, wherein any two adjacent ones of said impellers are circumferentially disaligned with each other in such a manner that radial outer edges of corresponding blades of said adjacent impellers are apart from each other by a distance which in not more than 20% of an outer diameter of said impeller.

15. Apparatus according to claim 6, wherein a plurality of impellers are provided along said axis of rotation.

16. Apparatus according to claim 15, wherein any two adjacent ones of said impellers are circumferentially disaligned from each other in such a manner that radial outer edges of corresponding blades of said adjacent impellers are apart from each other by a distance which is not more than 20% of an outer diameter of said impellers.

17. Apparatus according to claim 1, wherein a plane in which each of said blades extends is parallel to said axis of rotation.

18. A defoaming apparatus for a reactor, comprising:

an impeller having a rotation axis and disposed in an upper portion of an interior of the reactor in which a chemical reaction is effected, said impeller having a plurality of radially outwardly-extending blades, each of said blades curving, within a plane perpendicular to the impeller rotation axis, away from the rotation axis toward a direction of rotation; and a drive mechanism for rotating said impeller about said impeller rotation axis in the direction of rotation.

19. Apparatus according to claim 7, wherein no structure is disposed between adjacent impellers of said plurality of impellers.

20. A defoaming apparatus for a reactor, comprising:

an impeller disposed at an upper portion of an interior of the reactor in which a chemical reaction is effected, said impeller having a plurality of radially outwardly-extending blades, each of said blades being curved;

each of said blades including a respective outer end inclined toward a direction of rotation; and drive means for rotating said impeller in the direction of rotation about an axis of rotation thereof;

whereby the outer end leads a remaining portion of the blade during the rotation;

wherein a plurality of impellers are disposed along the axis of rotation; and wherein two adjacent ones of said impellers are circumferentially disaligned with each other in such a manner that radial outer edges of corresponding blades of the adjacent impellers are separated by a distance which is not more than 20% of an outer diameter of the impeller.

* * * * *